United States Patent Office 3,260,168
Patented July 12, 1966

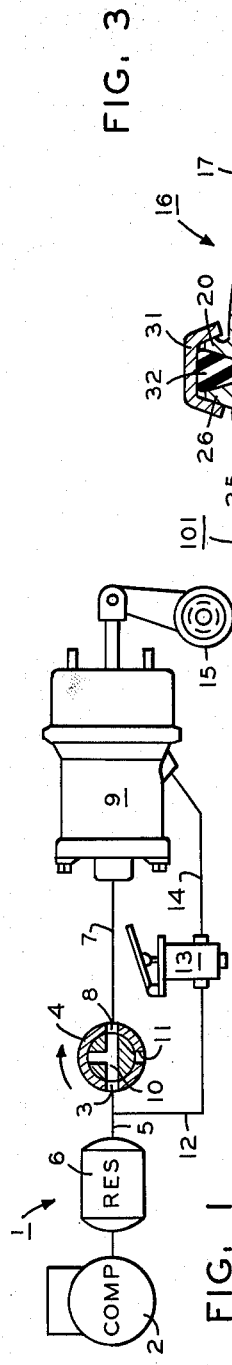

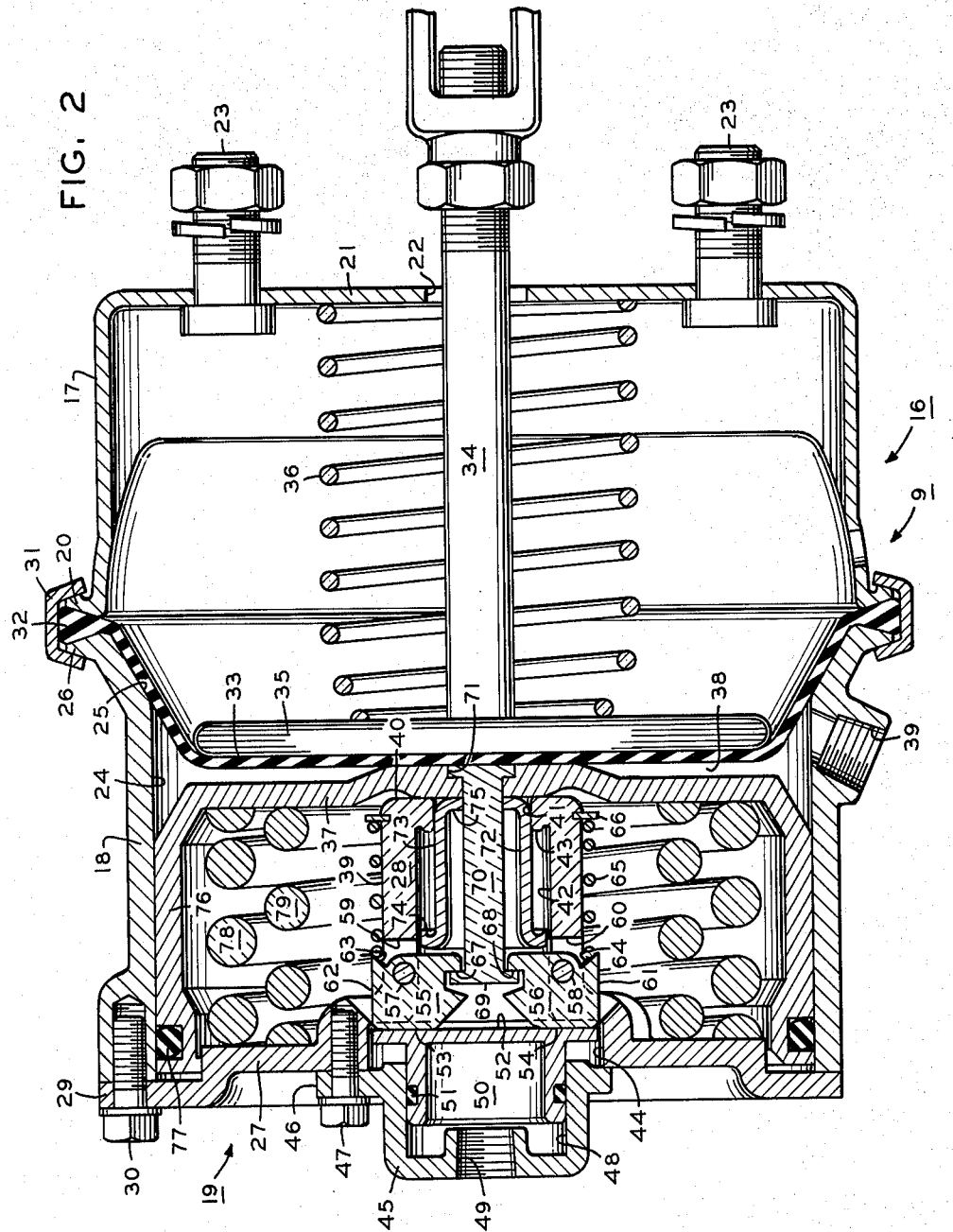

3,260,168
FRICTION DEVICE OPERATING MECHANISM
Oliver B. Cruse, Florissant, Mo., assignor to Wagner Electric Corporation, St. Louis, Mo., a corporation of Delaware
Filed May 22, 1962, Ser. No. 196,789
20 Claims. (Cl. 92—24)

This invention relates to friction device operating mechanisms and in particular to those having mechanically retained, resilient emergency actuating means therein.

In the past, many friction device operating mechanisms have been provided with a service portion having service actuating means therein for energizing a vehicle friction device in response to metered fluid pressure from the vehicle fluid pressure system and also with a separate emergency portion having resilient emergency actuating means therein for automatically energizing said friction device when the fluid pressure in said system was reduced below a predetermined value. One of the undesirable features of such past friction device operating mechanisms was that the service and emergency actuating means were mounted in separate chambers or portions which necessitated expensively cast housings, and another undesirable feature was that the resilient emergency actuating means "creeped" toward a friction device operating position when the system fluid pressure was slowly reduced to a value less than the predetermined value wherein the vehicle was unknowingly operated for extended periods of time with the friction device energized in a "drag" condition, i.e., not energized enough to effect appreciable vehicle deceleration.

An object of the present invention is to provide a friction device operating mechanism which overcomes the abovementioned undesirable features.

Another object of the present invention is to provide a friction device operating mechanism having service and emergency actuating means for friction device energizing purposes wherein the forces transmitted by said device and emergency actuating means are non-additive.

And still another object of the present invention is to provide a friction device operating mechanism having means therein to positively restrain the emergency actuating means against friction device energizing movement until the fluid pressure of the vehicle fluid pressure system is reduced to a predetermined amount.

These and other objects and advantages will become apparent hereinafter.

Briefly, the invention embodies a source of fluid pressure, service actuating means for energizing a friction device in response to metered fluid pressure from said source, resilient emergency actuating means for automatically energizing said friction device when the fluid pressure of said source is less than a predetermined amount, and means for preventing movement of said resilient emergency actuating means to energize said friction device until the fluid pressure of said source is reduced to the predetermined amount.

The invention also consists in the parts and arrangements and combinations of parts hereinafter described and claimed. In the accompanying drawings which form a part of the specification and wherein like numerals refer to like parts wherever they occur:

FIG. 1 is a diagrammatic view of a vehicle friction device actuating system showing a friction device operating mechanism embodying the present invention therein, FIG. 2 is a greatly enlarged cross-sectional view of an embodiment of the friction device operating mechanism shown in FIG. 1, and FIG. 3 is a greatly enlarged cross-sectional view of another embodiment of the friction device operating mechanism shown in FIG. 1.

Referring now to FIG. 1 in detail, a friction device actuating system, indicated generally at 1, is provided with fluid pressure generating means, such as compressor 2, which is connected to an inlet 3 of a charging or control valve 4 by a conduit 5, and a fluid pressure storage reservoir 6 is interposed in the conduit 5 providing, in combination with the compressor 2, a source of fluid pressure. Another conduit 7 is interposed between an outlet 8 of the charging valve 4 and the emergency port of a friction device operating mechanism or actuating cylinder 9. The charging valve 4 is provided with passage means 10 connecting the inlet 3 with the outlet 8; however, said charging valve can be rotated clockwise (in the direction of the arrow) positioning said passage means 10 to interrupt pressure fluid communication between said inlet and outlet and to establish pressure fluid communication between said outlet and an exhaust port 11 to vent said outlet to atmosphere. A conduit 12 has one end intersecting the conduit 5 and the other end thereof connecting with the inlet side of an application valve 13, and another conduit or service line 14 is interposed between the outlet or service side of said application valve and the service port of the actuating cylinder 9. To complete the system 1, the push rod of the actuating cylinder 9 is pivotally connected with linkage means or an actuating lever, such as slack adjuster 15, for energizing a friction device (not shown).

The actuator 9, FIG. 2, is provided with a housing, indicated generally at 16, including a cup-shaped end plate 17, a cylinder 18, and a cylinder closure member indicated generally at 19. The end plate 17 is provided with a peripheral flange 20 adjacent the open end thereof and a base wall 21 having a centrally located venting aperture 22 therein. A plurality of mounting studs 23 are fixedly attached to the endwall 21 by suitable means, such as upset welding, and are adapted for fixed connection with a cooperating mounting bracket (not shown) adjacent the friction device. The cylinder 18 is provided with a bore 24 and an axially aligned tapered bore 25 extending therethrough, and a peripheral flange 26 is provided on the cylinder 18 adjacent the rightward end of the tapered bore 25 in opposed relation to the peripheral flange 20 of the end plate 17. The bore closure member 19 is provided with an endwall 27 having a centrally deposed, integrally formed cylindrical extension or hub 28 which protrudes coaxially into the cylinder bore 24 and a peripheral portion 29 which is fixedly attached to the cylinder 18 adjacent the leftward end of said cylinder bore 24 by suitable means, such as a plurality of studs 30.

A conventional clamping band 31 is positioned in clamping engagement with the opposed end plate flange 20 and cylinder flange 26, and the compressive force of said clamping engagement serves to maintain a peripheral bead 32 of a diaphragm or service actuating means 33 in sealable abutting engagement between the flanges 20 and 26. A push rod 34 extends coaxially through the venting aperture 22 in the end plate base wall 21 having an exterior or working end pivotally connected with the slack adjuster, as previously mentioned, and an interior end connected by suitable means, such as staking, with an abutment plate or disc 35. The compressive force of a return spring 36 interposed between the end plate base wall 21 and the abutment plate 35 serves to normally bias the push rod 34 to an inoperative position wherein the diaphragm 33 is abuttingly engaged between the abutment plate 35 and emergency actuating means or piston 37 (to be discussed hereinafter). An expansible service or actuating chamber 38 is formed in the cylinder bore and tapered bore 24 and 25 between the diaphragm 33 and the piston 37, and a service port 39 which receives the conduit 14, as previously mentioned, is provided in the cylinder 18 in open pressure fluid communication with the service chamber 38.

The cylindrical hub 28 of the closure member endwall 27 is provided with an annular peripheral surface 39 which is intersected by a radially extending free end surface 40. Stepped bores 41 and 42 extend axially through the cylindrical hub 28 having an annular abutment shoulder or surface 43 formed therebetween, and said stepped bore 41 intersects with the free end surface 40 of the cylindrical hub 28 while the stepped bore 42 connects with the rightward end of an axially aligned counterbore 44 provided in the closure member endwall 27. The leftward end of the counterbore 44 is closed by an end cap or control housing 45 provided with an integral annular mounting flange 46 which is fixedly attached to the closure member endwall 27 by suitable means, such as a plurality of studs 47. The end cap 45 is provided with a bore 48 in axial alignment with the closure member counterbore 44, and an emergency or control port 49 which receives the conduit 7, as previously mentioned, is also provided in said end cap in pressure fluid communication with the end cap bore 48. A cup-shaped control piston 50 is slidably positioned in the end cap bore 48 and carries a seal 51 disposed in sealing engagement with said end cap bore. The control piston 50 is provided with an abutment end 52 which extends coaxially into the endwall counterbore 44 to normally engage surfaces 53, 54 of retaining cams or members 55, 56 which are pivotally mounted on pins 57, 58 fixedly positioned in slots 59, 60, respectively, provided adjacent the leftward end of the cylindrical hub 28 between the stepped bore 42 and the hub peripheral surface 39. The cams 55, 56 are also provided with surfaces 61, 62 and spring receiving notches 63, 64, respectively, and a cam spring 65 received on the hub peripheral surface 39 has one end biased into engagement with the cam spring notches 63, 64 and the other end thereof biased into engagement with a snap ring or C-washer 66 carried in said hub peripheral surface adjacent the free end 40 of the hub 28. The cams 55, 56 are also provided with locking or restraining notches 67, 68, respectively, which receive an enlarged annular head 69 provided on the leftward end of a piston extension 70. The piston extension 70 extends coaxially through the stepped bores 41 and 42, and the rightward end of said piston extension is fixedly connected with the emergency piston 37 by suitable means, such as staking at 71. A lost motion connection, such as the tubular member 72, is provided with a peripheral surface 73 which is slidably received in the stepped bore 41. A radially outwardly extending flange 74 is integrally provided on the leftward end of said tubular member 72 normally in spaced relation with the abutment shoulder 43, and a radially inwardly extending flange 75 is integrally provided on the rightward end of said tubular member 72 in sliding engagement with the piston extension 70 and in spaced relation with the enlarged head 69 thereof. The emergency piston 37 is provided with a sleeve portion 76 in slidable engagement with cylinder bore 24, and an O-ring 77 is carried in said sleeve portion in sealable engagement with said cylinder bore. A pair of concentrically positioned emergency springs 78, 79 are interposed between the closure member endwall 27 and the piston 37 normally biasing said piston rightwardly in a work-producing direction. Of course, it is apparent that the springs 78, 79 can be oppositely wound to prevent the coils of one from slipping between the coils of the other and causing interference therebetween. The compressive force of springs 78, 79 is transmitted through the emergency piston 37, the piston extension 70 and the locking engagement between the piston extension head 69 and cam locking notches 67, 68 to cams 55, 56 which are positioned by the control piston 50 thereby positively containing the compressive force of said springs between the endwall 27 and the emergency piston 37 to prevent movement of said emergency piston.

In the operation with the component parts of the system 1 and friction device operating mechanism 9 positioned as shown in FIGS. 1 and 2, assume that normal vehicle operating conditions exist wherein the storage reservoir 6 is charged with fluid pressure above a predetermined amount from the compressor 2 and wherein the reservoir 6 is connected in open fluid pressure communication with the control bore 48 via the conduit 5, the inlet 3, passage means 10 and outlet 8 of the charging valve 4, the conduit 7 and the emergency port 49. The fluid pressure so transmitted to the control bore 48 acts on the effective area of the control piston 50 creating a holding or restraining force to position the end 52 thereof in engagement with cam surfaces 53, 54. In this manner, cams 55, 56 are positively positioned against rotation on their pins 57, 58 and the locking engagement between the cam locking notches 67, 68 and the piston extension head 69 positively retains the emergency piston 37 in an inoperative position and positively prevents said emergency piston from creeping or moving in a work-producing direction to an operative position in the cylinder bore 24 in response to the compressive force of emergency springs 78, 79.

If the operator desires to make a normal service application to energize the friction device and effect vehicle deceleration or a complete stop, the application valve 13 is actuated to meter fluid pressure from the reservoir 6 through conduits 5 and 12, said application valve, the conduit 14 and the service port 39 of the friction device operating mechanism 9 into the service chamber 38. The fluid pressure so established in the service chamber 38 acts on the effective area of the diaphragm 33 creating a service force to move said diaphragm, the plate 35 and push rod 34 rightwardly to an operative position against the compressive force of the return spring 36 thereby actuating the working end of said push rod to rotate the slack adjuster 15 and energize the friction device (not shown) under normal operating conditions. When the application valve 13 is de-actuated, the fluid pressure in the service chamber 38 is exhausted to atmosphere through the service port 39, the conduit 14 and the exhaust port of said application valve thereby eliminating the service force, and the compressive force of the return spring 36 subsequently moves the slack adjuster 15, the push rod 34 and plate 35, and the diaphragm 33 to their original inoperative positions.

When the fluid pressure in the reservoir 6 is reduced, but not below the predetermined amount, due to leaks in the system 1 or a non-producing compressor 2, or the like, the fluid pressure in the control bore 48 is correspondingly reduced thereby reducing the holding force urging the control piston end 52 into positioning engagement with cam surfaces 53, 54; however, as long as the holding force is greater than the compressive force of emergency springs 78, 79, the locking engagement between cam locking notches 67, 68 and the piston extension head 69 prevents creep or movement of the emergency piston 37 in a work-producing direction to an operative position in response to the compressive force of emergency springs 78, 79.

Under emergency conditions when the fluid pressure in the reservoir 6 is reduced below the predetermined amount, the compressive force of emergency springs 78, 79 overcomes the holding force to move the emergency piston 37 rightwardly in a work-producing direction in the cylinder bore 24. The piston extension 70 is also moved rightwardly with the emergency piston 37, and since the compressive force of the emergency springs 78, 79 is greater than the holding force between the control piston 50 and cams 55, 56, the piston extension head 69 rotates the cam 55 in a counterclockwise direction on the pin 57 and pivots the cam 56 in a clockwise direction on the pin 58 against the control piston end 52. The compressive force of the cam spring 65 assists this rotational or pivotal movement of cams 55, 56 to move cam surfaces 61, 62 into positioning engagement with the control piston end 52 wherein cam locking notches 67, 68 are rotated out of locking engagement with the piston extension head 69 to permit unrestrained rightward movement of the emergency piston 37 and extension 70 in response to the spring force of springs 78, 79. The extension 70 moves relative to the tubular member 72 until the head 69 thereof engages the tubular member flange 75 to subsequently effect concert movement of said extension and tubular member until the tubular member flange 74 is moved into engagement with the abutment shoulder 43. In this manner, the rightward movement of said emergency piston, piston extension and tubular member in response to the compressive forces of springs 78, 79 is limited. Since the emergency piston 37 is normally engaged with the diaphragm 33, rightward movement of said emergency piston moves said diaphragm, the plate 35 and rod 34 rightwardly in a working direction against the compressive force of the return spring 36 to actuate the slack adjuster 15 and energize the friction device under emergency conditions.

When the fluid pressure failure of the system 1 has been corrected and fluid pressure in the reservoir 6 is increased to an amount greater than the predetermined amount wherein normal operating conditions are now re-established, the fluid pressure in the end cap bore 48 is correspondingly increased to re-establish the magnitude of the holding force. In order to de-actuate the actuating cylinder 9 and de-energize the friction device, the operator utilizes the re-established fluid pressure to make a service application, as previously described hereinabove. The re-established fluid pressure applied in the actuating chamber 38 re-establishes the service force which acts to maintain the diaphragm 33, plate 35 and rod 34, and slack adjuster 15 in their operative positions energizing the friction device; however, the re-established fluid pressure in the actuating chamber 38 also acts on the effective area of the emergency piston 37 establishing an opposing force in opposition to the spring forces of emergency springs 78, 79. When the magnitude of the opposing force overcomes that of the spring forces, the emergency piston 37, piston extension 70, and component parts associated therewith are moved leftwardly in the cylinder bore 24 to their original position against the compressive force of springs 78, 79. This leftward movement moves the piston extension head 69 into abutting engagement with notches 67, 68 of cams 55, 56 effecting rotation of the cam 55 in a clockwise direction on the pin 57 and effecting rotation of the cam 56 in a counterclockwise direction on the pin 58. This pivotal movement or rotation of cams 55 and 56 rotates cam surfaces 61, 62 out of engagement with the end 52 of the control piston 50 and re-engages cam surfaces 53, 54 with the control piston end 52 whereby the holding force between said cam surfaces 53, 54 and control piston end 52 re-establishes the locking engagement between cam locking notches 67, 68 and the piston extension head 69. When the fluid pressure is exhausted from the actuation chamber 38 at the end of the service application, the service and opposing forces are eliminated. The compressive force of the return spring 36 subsequently moves the slack adjuster 15, the push rod 34 and plate 35, and the diaphragm 33 to their original inoperative positions thereby de-energizing the friction device when the service force is eliminated, and the locking engagement between cam locking notches 67, 68 and piston extension head 69 once again retains the emergency piston 37 against rightward movement in response to the compressive forces of springs 78, 79 when the opposing force is eliminated. It should be noted that the service force and compressive force of emergency springs 78, 79 are non-additive since the opposing force acting against the emergency spring forces substantially counteracts or balances the service force; therefore, compounding of the emergency spring forces and the service force which might permanently distort or fracture the push rod 34, slack adjuster 15 or component parts of the friction device is obviated.

Of course the operator may initiate the emergency function of the actuating cylinder 9, if he so desires, by "dynamiting" the system 1. To "dynamite" the system 1, the operator merely rotates the charging valve 4 in a clockwise direction (as shown by the arrow in FIG. 1) to align the passage means 10 between the outlet 8 and exhaust port 11 thereby exhausting fluid pressure from the end cap bore 48 of the actuating cylinder 9 through the emergency port 49 into the conduit 7 and therefrom via said outlet, passage means and exhaust port of the charging valve 4 to the atmosphere. With the end cap bore 48 vented to atmosphere, the emergency conditions again prevail to initiate the emergency function of the actuating cylinder, as described hereinbefore, to automatically energize the friction device.

The present actuating cylinder 9 is provided with service actuating means, such as diaphragm 33, plate 35 and push rod 34, responsive to applied service fluid pressure to normally effect a service application of a friction device, and resilient emergency actuating means, such as the emergency piston 37 and emergency springs 78, 79, are provided to automatically energize the friction device when the fluid pressure in the system 1 is reduced below a predetermined value; however, holding or retaining means, such as cams 55, 56 and control piston 50, which operatively connect with said resilient emergency means, positively prevent movement thereof toward a friction device energizing position until the system fluid pressure is reduced to a value less than the predetermined amount thereby eliminating "creeping" movement of said resilient emergency means toward a friction device energizing position as the system fluid pressure is reduced to said predetermined amount.

Referring now to FIG. 3, a friction device operating mechanism or actuating cylinder 101 is shown having substantially the same component parts and functioning in the same manner as the previously described actuating cylinder 9 with the following exceptions. The cylinder 101 is provided with an integrally formed end wall 102 having an integral extension 103 with a cylindrical peripheral surface 103a protruding coaxially into the bore 24 and an integral, oppositely extending hub portion 104. A bore 105 is provided in the extension 103 and hub 104, and an end cap 106 having an emergency port 107 therein which receives the conduit 7, as previously mentioned, is threadably received on said hub 104 closing the bore 105. A control piston 108 is slidably positioned in the bore 105 in communication with the emergency port 107 and carries a seal 109 disposed in sealing engagement with said bore 105. The control piston 108 is provided with a conically-shaped abutment end 110 normally engaged with surfaces 111, 112 of cams 113, 114 which are pivotally or rotatably mounted on pins 115, 116 fixedly positioned in opposing slots 117, 118, respectively, provided between the bore 105 and the peripheral surface 103a of the extension 103. The cams 113, 114 are also provided with surfaces 119, 120, respectively, and a spring 121 interposed between the endwall of the bore 105 and a piston 122 slidable in the bore 105 normally biases said piston 122 into engagement with said cam surfaces 119, 120.

Emergency actuating means or piston 123 is provided with a working end 124 normally engaged with the diaphragm 33 and an integral sleeve portion 125 slidable in the bore 24, and said sleeve portion carries an O-ring 126 in sealable engagement with said bore 24. A cylindrical extension 127 is integrally provided on the piston 123 and is normally positioned in coaxial spaced relation with the bore 24 and the endwall extension 103, and a flange 128 integrally formed on the free end of said piston extension 127 extends radially inwardly therefrom for locking engagement with cam means 113, 114. A pair of springs 129 and 130, which may be oppositely wound if desired, are interposed between the housing endwall 102 and the piston 123, and the compressive forces of said springs 129 and 130 normally urge said piston 123 in a working direction against the locking engagement between said cam means 113, 114 and the piston extension flange 128.

It is now apparent that a novel friction device operating mechanism or actuating cylinder meeting the objects set out hereinbefore is provided and that changes and modifications in the disclosure may be made by those skilled in the art without departing from the spirit of the invention as defined by the claims which follow.

What I claim is:

1. In a friction device operating mechanism having a housing with abutment means therein, resiliently urged means movable in said housing relative to said abutment means from an inoperative position in a friction device energizing direction, and means for limiting the movement of said resiliently urged means in the friction device energizing direction comprising means connected in lost motion engagement between each of said resiliently urged means and abutment means.

2. In a friction device operating mechanism having a housing with abutment means therein, resiliently urged means movable in said housing relative to said abutment in a friction device energizing direction, and means for limiting the movement of said resiliently urged means in the friction device energizing direction and relative to said abutment means comprising means adapted for lost motion engagement between each of said resiliently urged means and abutment means, said resiliently urged means being movable in the friction device energizing direction into engagement with said last named means to thereafter move said last named means into engagement with said abutment means.

3. In a friction device operating mechanism having a housing with an abutment member therein, means normally urged for movement in said housing in a friction device energizing direction and relative to said abutment member, the combination therewith comprising means adapted for interconnection between said first named means and abutment member to limit the movement of said first named means in said direction and relative to said abutment member including an abutment flange, said first named means being movable in said direction into lost motion engagement with said abutment flange to thereafter concertly move said interconnection means into lost motion engagement with said abutment member.

4. In a friction device operating mechanism having a housing with an abutment member therein, resiliently urged means movable in said housing in a friction device operating direction and relative to said abutment member, the combination therewith comprising means movable within said housing and adapted for interconnection between said resiliently urged means and abutment member to limit the movement of said resiliently urged means in said direction and relative to said abutment means including a pair of spaced flange means for lost motion engagement with said resiliently urged means and abutment member, said resiliently urged means being movable in said direction into lost motion engagement with one of said flange means and said interconnection means being thereafter concertly movable with said resiliently urged means in said direction to move the other of said flange means into lost motion engagement with said abutment member.

5. In a friction device operating mechanism comprising a housing, means within said housing defining an abutment, other means including extension means normally urged for movement in said housing in a friction device energizing direction, and means movable within said first named means and adapted for lost motion engagement with each of said extension means and said abutment, said extension means being movable into lost motion engagement with said last named means and said extension means and last named means being thereafter movable in concert to move said last named means into lost motion engagement with said abutment upon the movement of said other means in said direction.

6. In a friction device operating mechanism comprising a housing, means within said housing defining an abutment, other means including extension means normally urged for movement in said housing in a friction device energizing direction and relative to said abutment, means movable within said first named means and adapted for substantially rigid interconnection between said abutment and extension means to limit movement of said other means in said direction, and a pair of spaced flange means on said last named means for lost motion engagement with said extension means and said abutment, said extension means being initially movable into lost motion engagement with one of said flange means and said extension means and said last named means being thereafter concertly movable to move the other of said flange means into lost motion engagement with said abutment when said other means is urged for movement in said direction.

7. In a friction device operating mechanism comprising a housing, means within said housing having a bore therein, abutment means in said bore, other means normally urged for movement in said housing in a friction device energizing direction and relative to said abutment means, extension means on said other means and coaxial with said bore, a connection member movable in said bore and coaxial with said extension means, and spaced flange means on said connection member for lost motion engagement with said extension means and abutment means, said extension means being initially movable into lost motion engagement with one of said flange means and said extension means and connection member being thereafter concertly movable to move the other of said flange means into lost motion engagement with said abutment means when said other means is moved in the friction device operating direction.

8. In a friction device operating mechanism comprising a housing, means connected with said housing having a bore therein, abutment means in said bore, resiliently urged means adapted for movement in said housing in a friction device energizing direction, extension means on said resiliently urged means adapted for movement therewith and coaxial with said bore including other abutment means, a connection member adapted for substantially rigid interconnection between said first named means and extension means to limit movement of said resiliently urged means in said direction including a first flange slidable in said bore for lost motion engagement with said first named abutment means, and a second flange on said connection member and axially spaced from said first flange for lost motion engagement with said other abutment means, said extension means being initially movable to move said other abutment means into lost motion engagement with said second flange and said extension means and connection member being thereafter concertly movable to move said first flange in said bore into lost motion engagement with said first named abutment means upon movement of said resiliently urged means in said direction.

9. In a friction device operating mechanism comprising a housing, means connected with said housing having a stepped bore therein and an abutment shoulder defined between said stepped bores, resiliently urged means normally urged for movement in said housing from an inoperative position in a friction device energizing direction away from said first named means, a sleeve member slidable in the smaller of said stepped bores and having a bore therethrough, a first annular flange on said sleeve member slidable in the larger of said stepped bores and normally in axial spaced relation with said abutment shoulder, extension means on said resiliently urged means, a free end portion on said extension means including another abutment shoulder extending through said sleeve member bore when said resiliently urged means is in the inoperative position thereof, a second annular flange on said sleeve member radially spaced from said extension means and normally in axial spaced relation with said other abutment shoulder, said extension means being initially movable to engage said other abutment shoulder with said second flange to then move said sleeve member therewith to engage said first flange with said first named abutment shoulder and form a substantially rigid movement limiting connection between said first named and resiliently urged means upon movement of said resiliently urged means from the inoperative position thereof in the friction device energizing direction.

10. A friction device operating mechanism comprising a housing with abutment means therein, resiliently urged means movable in said housing relative to said abutment means from an inoperative position in a friction device energizing direction, other means within said housing adapted for releasable engagement with said resiliently urged means in the inoperative position thereof, control means engaged with said other means and defining with said housing a fluid pressure chamber, said control means being responsive to fluid pressure in said chamber in excess of a predetermined value to engage said other means with said resiliently urged means and substantially maintain said resiliently urged means in the inoperative position against movement thereof in said direction and said control means being responsive to reduction of fluid pressure in said chamber less than the predetermined value to permit disengagement of said other means from said resiliently urged means and movement thereof in said direction, and means for limiting the movement of said resiliently urged means in said direction including means connected in lost motion engagement between each of said resiliently urged means and abutment means.

11. The friction device operating mechanism according to claim 10 wherein said last named means includes a pair of flange means, said resiliently urged means being movable in said direction into lost motion engagement with one of said flange means to thereafter concertly move said last named means in said direction until the other of said flange means is moved into lost motion engagement with said abutment means.

12. A friction device operating mechanism comprising a housing with abutment means therein, resiliently urged means movable in said housing relative to said abutment means from an inoperative position in a friction device energizing direction, other means within said housing adapted for releasable engagement with said resiliently urged means in the operative position thereof, control means engaged with said other means and defining with said housing a fluid pressure chamber, said control means being responsive to fluid pressure in said chamber in excess of a predetermined value to engage said other means with said resiliently urged means and substantially maintain said resiliently urged means in the inoperative position against movement thereof in said direction and said control means being responsive to reduction of fluid pressure in said chamber less than the predetermined value to permit disengagement of said other means from said resiliently urged means and movement thereof in said direction, and connection means for interconnection between said resiliently urged means and said abutment means to limit the movement of said resiliently urged means in said direction and relative to said abutment means including a pair of flange means normally spaced from said resiliently urged means and abutment means and adapted for lost motion engagement therewith, respectively, said resiliently urged means being initially movable in said direction into lost motion engagement with one of said flange means to thereafter move said connection means to a position interconnected between said resiliently urged means and abutment means upon movement of the other of said flange means therewith into lost motion engagement with said abutment means.

13. A friction device operating mechanism comprising a housing, means connected with said housing defining an abutment, other means including extension means normally urged for movement in said housing from an inoperative position in a friction device energizing direction and relative to said abutment, cam means pivotally mounted within said housing for releasable engagement with said extension means when said other means is in the inoperative position, control means engaged with said releasable means and defining with said housing a fluid pressure chamber, said control means being responsive to fluid pressure in said chamber in excess of a predetermined value to pivotally urge said cam means into engagement with said extension means when said other means is in the inoperative positon and said other means being urged to move in said direction to pivotally displace said cam means from engagement with said extension means and against said control means upon reduction of the fluid pressure in said chamber to a value less than the predetermined value, means movable within said first named means and adapted for substantially rigid interconnection between said abutment and extension means to limit movement of said other means in said direction, and a pair of flange means on said last named means for lost motion engagement with said extension means and abutment, said extension means being initially movable into lost motion engagement with one of said flange means and said extension means and said last named means being thereafter concertly movable to move the other of said flange means into lost motion engagement with said abutment when said other means is moved in said one direction.

14. A friction device operating mechanism comprising a housing, means connected with said housing having a bore therein, abutment means in said bore, resiliently urged means movable in said housing between an inoperative position and an operative friction device energizing position, extension means on said resiliently urged means adapted for movement therewith and coaxial with said bore including other abutment means, cam means pivotally mounted in said first named means and extending into said bore for releasable engagement with said extension means when said resiliently urged means is in the inoperative position, control means engaged with said cam means and defining with said housing a fluid pressure chamber, said control means being responsive to fluid pressure in said chamber in excess of a predetermined amount to pivotally displaced said cam means into engagement with said extension means when said resiliently urged means is in the inoperative position to substantially maintain said resiliently urged means against movement thereof to the operative position and said control means being responsive to a reduction of fluid pressure in said chamber less than the predetermined amount to permit pivotal disengagement of said cam means from said extension means and movement thereof with said resiliently urged means to the operative position, a connection member adapted for substantially rigid interconnection between said resiliently urged means and said first named means to limit the movement of said resiliently urged means to the operative position including a first flange slidable in said bore for lost motion engagement with said first named abutment means, and a second flange on said connection member in axial spaced relation with said first flange for lost motion engagement with said other abutment means, said extension means being initially movable with said resiliently urged means toward the operative position to move said other abutment means into lost motion engagement with said second flange and said extension means and connection member being thereafter concertly movable to move said first flange in said bore into lost motion engagement with said first named abutment means and provide the substantially rigid motion limiting connection between said resiliently urged means and first named means.

15. A friction device operating mechanism comprising a housing, means connected with said housing having a stepped bore therein and an abutment shoulder defined between said stepped bores, resiliently urged means normally urged for movement in said housing from an inoperative position in a friction device energizing direction away from said first named means, a sleeve member slidable in the smaller of said stepped bores and having a bore therethrough, a first annular flange in said sleeve member slidable in the larger of said stepped bores and normally in axial spaced relation with said abutment shoulder, extension means on said resiliently urged means, a free end portion on said extension means including another abutment shoulder extending through said sleeve member bore when said resiliently urged means is in the inoperative position, a second annular flange on said sleeve member radially spaced from said extension means and in axial spaced relation with said other abutment shoulder when said resiliently urged means is in the inoperative position, cam means pivotally mounted in said first named means and extending into said larger stepped bore for releasable engagement with said other abutment shoulder when said resilient means is in the inoperative position, and control means engaged with said cam means in the larger stepped bore and defining with said first named means an expansible fluid pressure chamber, said control means being responsive to fluid pressure in said chamber to engage said cam means with said other abutment shoulder when said resiliently urged means is in the inoperative position to substantially maintain said resiliently urged means and extension means against movement thereof in said direction and said control means being responsive to a reduction of fluid pressure in said chamber to a value less than the predetermined value to permit disengagement of said cam means from said other abutment means and movement of said extension means and resiliently urged means in said direction, said other abutment means being movable with said extension means in said direction into engagement with said second flange to thereafter move said sleeve member in concert with said extension means and engage said first flange with said first named abutment shoulder providing a substantially rigid connection between said first named means and resiliently urged means to limit movement of said resiliently urged means in said direction.

16. A friction device operating mechanism comprising a housing, means connected with said housing and defining a cylinder therein, an axially disposed bore in said cylinder, resiliently urged means movable in said housing between an inoperative position and an operative friction device energizing position, cam means pivotally mounted in said cylinder and having first surfaces adapted to extend radially outwardly of said cylinder and second surfaces extending into said axial bore, said first surfaces of said cam means being adapted for engagement with said resiliently urged means in the inoperative position thereof, central control means movable in said axial bore and engaged with said second surfaces of said cam means, a fluid pressure chamber defined in said axial bore by said control means, said control means being responsive to fluid pressure in said chamber in excess of a predetermined amount to engage said first surfaces of said cam means with said resiliently urged means and substantially maintain said resiliently urged means in the inoperative position against movement and said control means being responsive to a reduction of fluid pressure in said chamber less than the predetermined amount to permit disengagement of said first surfaces of said cam means from said resiliently urged means and movement thereof to the operative position.

17. The friction device operating mechanism according to claim 16 comprising resilient means engaged with said cam means to normally urge said second surfaces of said cam means into engagement with said control means.

18. The friction device operating mechanism according to claim 16 comprising a piston slidable in said bore, and resilient means normally urging said piston into engagement with said cam means to pivot said cam means in a direction toward engagement of said second surfaces with said control means and toward disengagement of said first surfaces from said resiliently urged means.

19. The friction device operating mechanism according to claim 16 wherein said resiliently urged means includes extension means movable therewith and having flange means on the free end thereof, said cam means being engaged with said flange means when said resiliently urged means is in the inoperative position.

20. The friction device operating mechanism according to claim 16 comprising first and second slots extending through said cylinder and interconnecting with said bore, said cam means including first and second cams rotatably mounted in said slots, said first and second cams having said second surfaces extending radially inwardly into said bore into engagement with said control means and said first surfaces extending radially outwardly from said cylinder, annular extension means on said resiliently urged means and coaxial with said cylinder, and flange means on said extension means extending radially inwardly therefrom said flange means being engaged by said first surfaces of said first and second cams when said resiliently urged means is in the inoperative position.

References Cited by the Examiner
UNITED STATES PATENTS

| | | | |
|---|---|---|---|
| 859,843 | 7/1907 | Rogers | 92—24 |
| 2,754,805 | 7/1956 | Beman | 92—63 |
| 2,854,954 | 10/1958 | Howze | 92—63 |
| 2,992,630 | 7/1961 | Leighton et al. | 92—63 |

SAMUEL LEVINE, *Primary Examiner.*

RICHARD B. WILKINSON, *Examiner.*

A. L. SMITH, H. G. SHIELDS, *Assistant Examiners.*